US009706228B2

United States Patent
Hendry et al.

(10) Patent No.: US 9,706,228 B2
(45) Date of Patent: Jul. 11, 2017

(54) SUPPORT FOR LARGE NUMBERS OF VIEWS IN MULTI-LAYER CODING

(71) Applicant: QUALCOMM Incorporated, San Diego, CA (US)

(72) Inventors: Fnu Hendry, Poway, CA (US); Ying Chen, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 14/514,310

(22) Filed: Oct. 14, 2014

(65) Prior Publication Data
US 2015/0103907 A1    Apr. 16, 2015

Related U.S. Application Data

(60) Provisional application No. 61/891,350, filed on Oct. 15, 2013.

(51) Int. Cl.
*H04N 19/597* (2014.01)
*H04N 19/70* (2014.01)

(52) U.S. Cl.
CPC ........... *H04N 19/70* (2014.11); *H04N 19/597* (2014.11)

(58) Field of Classification Search
None
See application file for complete search history.

(56) References Cited

U.S. PATENT DOCUMENTS

| | | | |
|---|---|---|---|
| 6,625,223 B1* | 9/2003 | Wimmer | H04L 7/042 375/259 |
| 2011/0122944 A1* | 5/2011 | Gupta | H04N 19/176 375/240.12 |
| 2011/0153997 A1* | 6/2011 | Loktyukhin | G06F 9/30018 712/223 |
| 2012/0044322 A1* | 2/2012 | Tian | H04N 19/597 348/43 |
| 2012/0057635 A1* | 3/2012 | Rusert | H04N 21/234309 375/240.16 |
| 2014/0140398 A1* | 5/2014 | Deshpande | H04N 19/30 375/240.12 |
| 2015/0256838 A1* | 9/2015 | Deshpande | H04N 19/70 375/240.02 |

(Continued)

OTHER PUBLICATIONS

R. Sjoberg et al., "Overview of HEVC High-Level Syntax and Reference Picture Management," in IEEE Transactions on Circuits and Systems for Video Technology, vol. 22, No. 12, pp. 1858-1870, Dec. 2012. doi: 10.1109/TCSVT.2012.2223052.*

(Continued)

*Primary Examiner* — Jeremaiah C Hallenbeck-Huber
*Assistant Examiner* — Stefan Gadomski
(74) *Attorney, Agent, or Firm* — Shumaker & Sieffert, P.A.

(57) ABSTRACT

A computing device obtains a Network Abstraction Layer (NAL) unit header of a NAL unit of the multi-layer video data. The NAL unit header comprises a layer identifier syntax element having a value that specifies an identifier of a layer of the NAL unit. The layer identifier syntax element comprises a plurality of bits that represent the value within a defined range of values. A requirement of the bitstream conforming to a video coding standard is that the value of the layer identifier syntax element is less than the maximum value of the range of values.

22 Claims, 4 Drawing Sheets

(56) References Cited

U.S. PATENT DOCUMENTS

| | | | | |
|---|---|---|---|---|
| 2015/0304667 | A1* | 10/2015 | Suehring | H04N 19/70 375/240.02 |
| 2016/0057441 | A1* | 2/2016 | Skupin | H04N 19/137 375/240.25 |
| 2016/0353120 | A1* | 12/2016 | Deshpande | H04N 19/70 |

OTHER PUBLICATIONS

Choi et al., "MV-HEVC/SHVC HLS: Extension of maximum number of layers" JCT-VC Meeting; Jul. 27- Aug. 2 2013; Vienna; No. JCT3V-E0115.*

Choi et al., "Layer identifier extension" JCT-VC Meeting; Apr. 18-26 2013; Incheon; No. JCTVC-M0164.*

Suehring et al., "3D/MV-HEVC HLS: Extending the supported number of layers" JCT-VC Meeting; Jul. 25-Aug. 2 2013; Vienna; No. JCTVC-N0355.*

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (For FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union, Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union, Apr. 2015, 634 pp.

Chen et al., "High Efficiency Video Coding (HEVC) Scalable Extension Draft 3", Jul. 25-Aug. 2, 2013; Joint Collaborative Team on Video Coding (JCT-VC) of ITU-T SG 16 WP 3 and ISO/IEC JTC 1/SC 29/WG 11, Doc. JCTVC-N1008_v3, 14th Meeting, Vienna, AT, Sep. 16, 2013, 68 pp.

Tech, et al., "MV-HEVC Draft Text 5", Jul. 27-Aug. 2, 2013; Joint Collaborative Team on 3D Video Coding Extension Development of ITU-T SG 16 WP 3 and ISO/IEC JTC 1/SC 29/WG 11, Doc: JCT3V-E1004-v6, 5th Meeting: Vienna, AT, Aug. 7, 2013, 65 pp.

Tech, et al., "3D-HEVC Test Model 4", JCT-3V Meeting; Apr. 20-26, 2013; Incheon; (The Joint Collaborative Team on 3D Video Coding Extension Development of ISO/IEC JTC1/SC29/WG11 and ITU-T SG.16); URL: http://phenix.int-evry.fr/jct2/, No. JCT3V-D1005, Jun. 17, 2013 , XP030130983, 52 pp.

Tech, et al., "3D-HEVC Test Model 4," JCT-3V Meeting; Incheon, (The Joint Collaborative Team on 3D Video Coding Extension Development of ISO/IEC JTC1/SC29/WG11 and ITU-T SG.16), Apr. 20-26, 2013; No. JCT3V-D1005_v1, Jun. 17, 2013; XP030130998, 56 pp.

Tech G., et al., "3D-HEVC Test Model 2," Oct. 13-19, 2012; JCT3V-B1005_d0, Joint Collaborative Team on 3D Video Coding Extension Development of ITU-T SG 16 WP 3 and ISO/IEC JTC 1/SC 29/WG 11, 2nd Meeting: Shanghai, CN, Dec. 23, 2012; 126 pp. [uploaded in parts].

Tech, et al., "3D-HEVC Draft Text 1", JCT-3V Meeting; MPEG Meeting; Jul. 27-Aug. 2, 2013; (The Joint Collaborative Team on 3D Video Coding Extension Development of ISO/IEC JTC1/SC29/WG11 and ITU-T SG.16); No. JCT3V-E1001_v3, Sep. 11, 2013; XP030130664, 89 pp.

Wang, et al., "High Efficiency Video Coding (HEVC) Defect Report", JCT-VC Meeting; Jul. 25-Aug. 2, 2013; Vienna; (Joint Collaborative Team on Video Coding of ISO/IEC JTC1/SC29/WG11 and ITU-TSG.16 ); URL: http://wftp3.itu.int/av-arch/jctvc-site/,,No. JCTVC-N1003, Sep. 27, 2013, XP030114947, 311 pp. [uploaded in parts].

Choi, et al., "MV-HEVC-/SHVC HLS: Extended layer identifier," JCT-VC Meeting; Oct. 23-Nov. 1, 2013; Vienna; (Joint Collaborative Team on Video Coding of ISO/IEC JTC1/SC29/WG11 and ITU-TSG.16 ); URL: http://wftp3.itu.int/av-arch/jctvc-site/, No. JCTVC-O137_v1, Oct. 15, 2013, 11 pp.

Choi, et al., "MV-HEVC-/SHVC HLS: Extended layer identifier," JCT-VC Meeting; Oct. 23-Nov. 1, 2013; Vienna; (Joint Collaborative Team on Video Coding of ISO/IEC JTC1/SC29/WG11 and ITU-TSG.16 ); URL: http://wftp3.itu.int/av-arch/jctvc-site/, No. JCTVC-O0137_v2, Oct. 15, 2013, 11 pp.

Choi, et al., "MV-HEVC-/SHVC HLS: Extended layer identifier," JCT-VC Meeting; Oct. 23-Nov. 1, 2013; Vienna; (Joint Collaborative Team on Video Coding of ISO/IEC JTC1/SC29/WG11 and ITU-TSG.16 ); URL: http://wftp3.itu.int/av-arch/jctvc-site/, No. JCTVC-O0137_v3, Oct. 21, 2013, 11 pp.

Choi, et al., "MV-HEVC-/SHVC HLS: Extended layer identifier," JCT-VC Meeting; Oct. 23-Nov. 1, 2013; Vienna; (Joint Collaborative Team on Video Coding of ISO/IEC JTC1/SC29/WG11 and ITU-TSG.16 ); URL: http://wftp3.itu.int/av-arch/jctvc-site/, No. JCTVC-O0137_r1, Oct. 21, 2013, 12 pp.

Suehring, et al., "3D/MV-HEVC HLS: Study and proposal of methods for extending the supported number of layers, Specification of method A," JCT-VC Meeting; Oct. 23-Nov. 1, 2013; (Joint Collaborative Team on Video Coding of ISO/IEC JTC1/SC29/WG11 and ITU-TSG.16 ); URL: http://wftp3.itu.int/av-arch/jctvc-site/, Oct. 17, 2013; No. JCTVC-O0200_spec_A_v1, 78 pp.

Suehring, et al., "3D/MV-HEVC HLS: Study and proposal of methods for extending the supported number of layers," JCT-VC Meeting; Oct. 23-Nov. 1, 2013; (Joint Collaborative Team on Video Coding of ISO/IEC JTC1/SC29/WG11 and ITU-TSG.16 ); URL: http://wftp3.itu.int/av-arch/jctvc-site/, Document JCTVC-O0200_v1, Oct. 15, 2013, 13 pp.

Suehring, et al., "3D/MV-HEVC HLS: Study and proposal of methods for extending the supported number of layers," JCT-VC Meeting; Oct. 23-Nov. 1, 2013; (Joint Collaborative Team on Video Coding of ISO/IEC JTC1/SC29/WG11 and ITU-TSG.16 ); URL: http://wftp3.itu.int/av-arch/jctvc-site/, Document JCTVC-O0200_v2, Oct. 15, 2013, 13 pp.

Rapaka, et al., "MV-HEVC/SHVC HLS: Comments on latest MV-HEVC and SHVC draft specs," Oct. 23-Nov. 1, 2013; (Joint Collaborative Team on Video Coding of ISO/IEC JTC1/SC29/WG11 and ITU-TSG.16 ); Document: JCTVC-O0223, Oct. 15, 2013; 5 pp.

(56) References Cited

OTHER PUBLICATIONS

Choi, "Extended layer identifier," JCTVC-O0137/JCT3V-F0050, Samsung Electronics, Oct. 15, 2013, slides 1-17.

Suhring, et al., "3D/MV-HEVC HLS: Study and proposal of methods for extending the supported number of layers," Document: JCT3V-O0200, Oct. 17, 2013, slides 1-17.

Chen, et al., "High efficiency video coding (HEVC) scalable extension Draft 7," Jun. 30-Jul. 9, 2014; (Joint Collaborative Team on Video Coding of ISO/IEC JTC1/SC29/WG11 and ITU-TSG.16 ); Document: JCTVC-R1008v7, Oct. 1, 2014, 175 pp.

Tech, et al., "MV-HEVC Draft Text 7", JCT-3V Meeting; Jan. 11-17, 2014; San Jose; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-G1004-v8, Mar. 17, 2014, XP030132042, 130 pp.

Suehring K. et al., "3D/MV-HEVC HLS: Extending the supported number of layers", Joint Collaborative Team on 3D Video Coding Extensions of ITU-T SG 16 WP 3 and ISO/IEC JTC 1/SC 29/WG 11—5th Meeting: Vienna, AT, Jul. 27, 2013-Aug. 2, 2013, Document: JCT3V-E0092—Joint Collaborative Team on Video Coding (JCT-VC) of ITU-T SG 16 WP 3 and ISO/IEC JTC 1/SC 29/WG 11—14th Meeting: Vienna, AT, Jul. 25, 2013-Aug. 2, 2013, Document: JCTVC-N0355 (8 pp).

Tech G. et al., "3D/MV-HEVC HLS: Dependency signaling for extending the supported number of layers", Joint collaborative Team on 3D Video Coding Extensions of ITU-T SG 16 WP 3 and ISO/IEC JTC 1/SC 29,WG 11—5th Meeting: Vienna, AT, Jul. 27, 2013-Aug. 2, 2013, Document: JCT3V-E0223 (7 pp).

Tech G. et al., "3D/MV-HEVC HLS: Flexible layer clustering for extending the supported number of layers", Joint collaborative Team on 3D Video Coding Extensions of ITU-T SG 16 WP 3 and ISO/IEC JTC 1/SC 29/WG 11—5th Meeting: Vienna, AT, Jul. 27, 2013-Aug. 2, 2013, Document: JCT3V-E0224 (9 pp).

\* cited by examiner

SUPPORT FOR LARGE NUMBERS OF VIEWS IN MULTI-LAYER CODING

This application claims the benefit of U.S. Provisional Patent Application No. 61/891,350, filed Oct. 15, 2013, the entire content of which is incorporated by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients.

A multi-view coding bitstream may be generated by encoding views, e.g., from multiple perspectives. Some three-dimensional (3D) video standards have been developed that make use of multi-view coding aspects. For example, different views may transmit left and right eye views to support 3D video. Alternatively, some 3D video coding processes may apply so-called multi-view plus depth coding. In multi-view plus depth coding, a 3D video bitstream may contain not only texture view components, but also depth view components. For example, each view may comprise a texture view component and a depth view component.

SUMMARY

In general, this disclosure describes techniques for supporting larger numbers of views in multi-layer video data. As described herein, a header of a Network Abstraction Layer (NAL) unit comprises a layer identifier syntax element. The layer identifier syntax element specifies an identifier of a layer to which the NAL unit belongs. A highest value of the layer identifier syntax element is reserved (i.e., not allowed to be used) in a video coding standard, such as multi-view high efficiency video coding (MV-HEVC). By reserving the highest value of the layer identifier syntax element, the highest value of the layer identifier syntax element may be used in a process to derive the identifier of the layer to which the NAL unit belongs.

In one aspect, this disclosure describes a method of decoding multi-layer video data, the method comprising obtaining, from a bitstream, a NAL unit header of a NAL unit of the multi-layer video data, the NAL unit header comprising a layer identifier syntax element having a value that specifies an identifier of a layer to which the NAL unit belongs, wherein the layer identifier syntax element comprises a plurality of bits that represent the value within a defined range of values, wherein a requirement of the bitstream conforming to a video coding standard is that the value of the layer identifier syntax element is less than the maximum value of the range of values.

In another aspect, this disclosure describes a method of encoding multi-layer video data, the method comprising: generating a Network Abstraction Layer (NAL) unit header of a NAL unit of the multi-layer video data, the NAL unit header comprising a layer identifier syntax element having a value that specifies an identifier of a layer to which the NAL unit belongs, wherein the layer identifier syntax element comprises a plurality of bits that represent the value within a defined range of values, wherein a requirement of the bitstream conforming to a video coding standard is that the value of the layer identifier syntax element is less than the maximum value of the range of values.

In another aspect, this disclosure describes a computing device comprising: a memory storing multi-layer video data; and one or more processors configured to obtain a Network Abstraction Layer (NAL) unit header of a NAL unit of the multi-layer video data, the NAL unit header comprising a layer identifier syntax element having a value that specifies an identifier of a layer to which the NAL unit belongs, wherein the layer identifier syntax element comprises a plurality of bits that represent the value within a defined range of values, wherein a requirement of the bitstream conforming to a video coding standard is that the value of the layer identifier syntax element is less than the maximum value of the range of values.

In another aspect, this disclosure describes a computing device comprising: a memory storing multi-layer video data; and one or more processors configured to generate a Network Abstraction Layer (NAL) unit header of a NAL unit of the multi-layer video data, the NAL unit header comprising a layer identifier syntax element having a value that specifies an identifier of a layer to which the NAL unit belongs, wherein the layer identifier syntax element comprises a plurality of bits that represent the value within a defined range of values, wherein a requirement of the bitstream conforming to a video coding standard is that the value of the layer identifier syntax element is less than the maximum value of the range of values.

In another aspect, this disclosure describes a computing device comprising: means for obtaining, from a bitstream, a Network Abstraction Layer (NAL) unit header of a NAL unit of the multi-layer video data, the NAL unit header comprising a layer identifier syntax element having a value that specifies an identifier of a layer to which the NAL unit belongs, wherein the layer identifier syntax element comprises a plurality of bits that represent the value within a defined range of values, wherein a requirement of the bitstream conforming to a video coding standard is that the value of the layer identifier syntax element is less than the maximum value of the range of values.

In another aspect, this disclosure describes a computing device comprising means for generating a Network Abstraction Layer (NAL) unit header of a NAL unit of the multi-layer video data, the NAL unit header comprising a layer identifier syntax element having a value that specifies an identifier of a layer to which the NAL unit belongs, wherein the layer identifier syntax element comprises a plurality of bits that represent the value within a defined range of values, wherein a requirement of the bitstream conforming to a video coding standard is that the value of the layer identifier syntax element is less than the maximum value of the range of values.

In another aspect, this disclosure describes a computer-readable data storage medium (e.g., a non-transitory computer-readable data storage medium) having instructions stored thereon that configure a device to obtain, from a bitstream, a Network Abstraction Layer (NAL) unit header of a NAL unit of the multi-layer video data, the NAL unit header comprising a layer identifier syntax element having a value that specifies an identifier of a layer to which the NAL unit belongs, wherein the layer identifier syntax element comprises a plurality of bits that represent the value within a defined range of values, wherein a requirement of the bitstream conforming to a video coding standard is that the value of the layer identifier syntax element is less than the maximum value of the range of values.

In another aspect, this disclosure describes a computer-readable data storage medium (e.g., a non-transitory computer-readable data storage medium) having instructions stored thereon that configure a device to generate a Network Abstraction Layer (NAL) unit header of a NAL unit of the multi-layer video data, the NAL unit header comprising a layer identifier syntax element having a value that specifies an identifier of a layer to which the NAL unit belongs, wherein the layer identifier syntax element comprises a plurality of bits that represent the value within a defined range of values, wherein a requirement of the bitstream conforming to a video coding standard is that the value of the layer identifier syntax element is less than the maximum value of the range of values.

The details of one or more examples of the disclosure are set forth in the accompanying drawings and the description below. Other features, objects, and advantages will be apparent from the description, drawings, and claims.

DETAILED DESCRIPTION

A bitstream may comprise an encoded representation of video data. More specifically, the bitstream may comprise a series of Network Abstraction Layer (NAL) units. Each of the NAL units may include a NAL unit header and a Raw Byte Sequence Payload (RBSP). In multi-view coding, NAL units may correspond to various layers. Each of the layers may correspond to a different view. A NAL unit header of a NAL unit may include a layer identifier syntax element that identifies a layer to which the NAL unit corresponds.

In some video coding standards, the layer identifier syntax element consists of a fixed number of bits. For instance, in the current working draft of Multi-View High Efficiency Video Coding (MV-HEVC) and the current working draft of scalable HEVC (SHVC), the layer identifier syntax element (nuh_layer_id) consists of 6 bits. The fact the number of bits of the layer identifier syntax element is fixed imposes a limit on the number of layers. For instance, if the layer identifier syntax element consists of 6 bits, there can be at most 64 layers.

However, in some instances, it may be desired to have more layers than the limit imposed by the number of bits of the layer identifier syntax element in a video coding standard, such as MV-HEVC and SHVC. At the same time, it may be desirable not to change the number of bits in the layer identifier syntax element or the NAL unit header, as prescribed by the video coding standard.

Hence, in accordance with one or more techniques of this disclosure, a highest value of the layer identifier syntax element is reserved in the video coding standard. In other words, the highest value of the layer identifier syntax element is not allowed to be used in the video coding standard. Thus, in some examples where the multi-view video coding data conforms to an extension of the video coding standard that supports more layers than the video coding standard, the layer identifier syntax element having the highest value, e.g., 63 in the case of a six-bit layer identifier syntax element, may correspond to a layer identifier equal to or greater than the highest value of the layer identifier syntax element.

Figure 1:
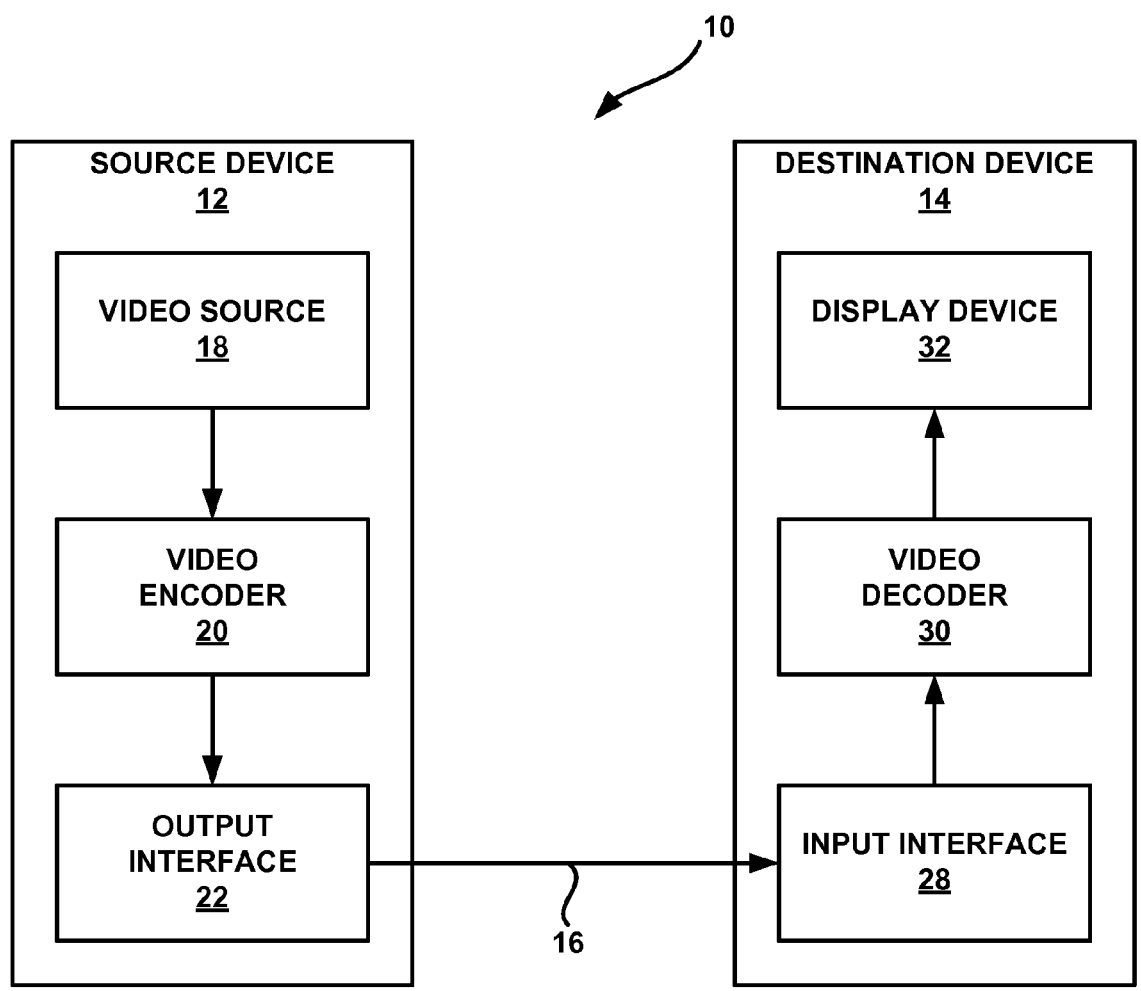
FIG. 1 is a block diagram illustrating an example video coding system that may utilize the techniques described in this disclosure.

Thus, in some examples of the disclosure, a video encoder may generate a NAL unit header of a NAL unit of the multi-layer video data. Similarly, a video decoder may obtain a NAL unit header of a NAL unit of the multi-layer video data. The NAL unit header comprises a layer identifier syntax element that specifies an identifier of a layer to which the NAL unit belongs. A highest value of the layer identifier syntax element is reserved in a video coding standard. For instance, the layer identifier syntax element has a value that specifies an identifier of a layer to which the NAL unit belongs. The layer identifier syntax element comprises a plurality of bits that represent the value within a defined range of values. A requirement of the bitstream conforming to a video coding standard is that the value of the layer identifier syntax element is less than the maximum value of the range of values FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Video decoder 30 may decode encoded video data. Display device 32 may display the decoded video data. Display device 32 may be integrated with or may be external to destination device 14. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multi-view Video Coding (MVC) extension, and MVC-based 3DV extension. In some instances, any bitstream conforming to the MVC-based 3DV extension of H.264/AVC always contains a sub-bitstream that is compliant to the MVC extension of H.264/AVC. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, ISO/IEC MPEG-2 Visual, ITU-T H.263, ISO/IEC MPEG-4 Visual, and ITU-T H.264, ISO/IEC Visual.

In other examples, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 8" is described in Bross et al., "High Efficiency Video Coding (HEVC) text specification draft 8," Joint Collaborative Team on Video Coding (JCT-VC) of ITU-T SG16 WP3 and ISO/IEC JTC1/SC29/WG11, 10$^{th}$ Meeting, Stockholm, Sweden, July 2012. Another draft of the upcoming HEVC standard, referred to as "HEVC Working Draft 9" is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11$^{th}$ Meeting, Shanghai, China, October 2012. Another HEVC draft specification, and referred to as HEVC WD hereinafter, is described in Wang et al., "High Efficiency Video Coding (HEVC) Defect Report," Joint Collaborative Team on Video Coding (JCT-VC) of ITU-T SG16 WP3 and ISO/IEC JTC1/SC29/WG11, 14th Meeting, Vienna, Austria, 25 Jul.-2 Aug. 2013, document no. JCTVC-N1003-v1.

Furthermore, there are ongoing efforts to produce scalable video coding, multi-view coding, and 3DV extensions for HEVC. The scalable video coding extension of HEVC may be referred to as SHEVC or SHVC. Jianle Chen et al., "High efficiency video coding (HEV) scalable extension draft 3, JCTVC-N1008 v3, Joint Collaborative Team on Video Coding (JCT-VC) of ITU-T SG 16 WP 3 and ISO/IEC JTC 1 SC 29 WG 11, 14th Meeting: Vienna, AT, 25 Jul.-2 Aug. 2013 (hereinafter SHVC WD3) is a Working Draft (WD) of SHVC.

Currently, a Joint Collaboration Team on 3D Video Coding (JCT-3C) of VCEG and MPEG is developing a 3DV standard based on HEVC, for which part of the standardization efforts includes the standardization of the multi-view video codec based on HEVC (MV-HEVC) and another part for 3D video coding based on HEVC (3D-HEVC). It is desirable that there are only high-level syntax (HLS) changes in MV-HEVC, such that no module in the coding unit (CU)/prediction unit (PU) level in HEVC needs to be re-designed and can be fully reused for MV-HEVC. In other words, MV-HEVC only provides for high-level syntax changes and not for low-level syntax changes, such as those at the CU/PU level. Tech et al., "MV-HEVC Draft Text 5," Joint Collaborative Team on 3D Video Coding Extension Development of ITU-T SG 16 WP 3 and ISO/IEC JTC 1/SC 29/WG 11, 5$^{th}$ Meeting, Vienna, AT, 27 Jul.-2 Aug. 2013, referred to as MV-HEVC WD5 hereinafter A Working Draft (WD) of MV-HEVC, is a recent Working Draft (WD) of MV-HEVC.

For 3D-HEVC, new coding tools, including those in coding unit/prediction unit level, for both texture and depth views may be included and supported. The reference software description as well as the working draft of 3D-HEVC is available as follows: Gerhard Tech, Krzysztof Wegner, Ying Chen, Sehoon Yea, "3D-HEVC Test Model 4," JCT3V-D1005_spec_v1, Joint Collaborative Team on 3D Video Coding Extension Development of ITU-T SG 16 WP 3 and ISO/IEC JTC 1/SC 29/WG 11, 4nd Meeting: Incheon, KR, Apr. 2013. Another version of the reference software description of 3D-HEVC is described in Tech et al., "3D-HEVC Test Model 3," Joint Collaborative Team on 3D Video Coding Extension Development of ITU-T SG 16 WP 3 and ISO/IEC JTC 1/SC 29/WG 11, 3rd Meeting: Geneva, CH, 17-23 Jan. 2013, document JCT3V-C1005_d0. Tech et al., "3D-HEVC Draft Text 1," Joint Collaborative Team on 3D Video Coding Extension Development of ITU-T SG 16 WP 3 and ISO/IEC JTC 1/SC 29/WG 11, 5th Meeting: Vienna, Austria, 27 Jul.-2 Aug. 2013, document JCT3V-E1005_d0.

Video encoder 20 and video decoder 30 may operate according to SHVC, MV-HEVC, and/or 3D-HEVC. In other words, video encoder 20 may generate video data that conforms to SHVC, MV-HEVC, and/or 3D-HEVC. Similarly, video decoder 30 may decode video data that conforms to SHVC, MV-HEVC, and/or 3D-HEVC.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a coding order (e.g., a raster scan order).

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. In some versions of HEVC, for the luma component of each PU, an intra prediction method is utilized with 33 angular prediction modes (indexed from 2 to 34), DC mode (indexed with 1) and Planar mode (indexed with 0).

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice. Each of the reference picture lists may include one or more reference pictures. When using uni-prediction, video encoder 20 may search the reference pictures in either or both RefPicList0 and RefPicList1 to determine a reference location within a reference picture.

Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion vector indicating a spatial displacement between a sample block of the PU and the first reference location and a second motion vector indicating a spatial displacement between the prediction block of the PU and the second reference location.

After video encoder 20 generates predictive blocks (e.g., predictive luma, Cb, and Cr blocks) for one or more PUs of a CU, video encoder 20 may generate one or more residual blocks for the CU. Each sample in a residual block of the CU may indicate a difference between a sample in a predictive block of the CU and a corresponding sample in a coding blocks of the CU. For example, video encoder 20 may generate a luma residual block for the CU. Each sample in the luma residual block of the CU indicates a difference between a luma sample in a predictive luma block of a PU of the CU and a corresponding sample in the original luma coding block of the CU. In addition, video encoder 20 may generate a Cb residual block for the CU. Each sample in the Cb residual block of the CU may indicate a difference between a Cb sample in a predictive Cb block of a PU of the CU and a corresponding sample in the original Cb coding block of the CU. Video encoder 20 may also generate a Cr residual block for the CU. Each sample in the Cr residual block of the CU may indicate a difference between a Cr sample in a predictive Cr block of a PU of the CU and a corresponding sample in the CU's original Cr coding block.

Furthermore, video encoder 20 may use quad-tree partitioning to decompose the residual blocks (e.g., luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. A coefficient block may be a two-dimensional array of transform coefficients. A transform coefficient may be a scalar quantity. For example, video encoder 20 may apply one or more transforms to a luma transform block of a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units. In general, multiple VCL NAL units may pertain to a single slice, but a single VCL NAL unit pertains to only a single slice.

HEVC and other video coding standards provide for various types of parameter sets. For example, a video parameter set (VPS) is a syntax structure comprising syntax elements that apply to zero or more entire coded video sequences (CVSs). A sequence parameter set (SPS) may contain information that applies to all slices of a CVS. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded. Parameter sets may include extensions for particular extensions of video coding standards. An extension of a parameter set may include syntax elements specific to an extension of a video coding standard. For example, an extension of a parameter set may include syntax elements used in SHVC, MV-HEVC, or 3D-HEVC but not base HEVC.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In MV-HEVC, 3D-HEVC and SHVC, a video encoder may generate a bitstream that comprises a series of NAL units. Different NAL units of the bitstream may be associated with different layers of the bitstream. A layer may be defined as a set of VCL NAL units and associated non-VCL NAL units that have the same layer identifier. A layer may be equivalent to a view in multi-view video coding. In multi-view video coding, a layer can contain all view components of the same layer with different time instances. Each view component may be a coded picture of the video scene belonging to a specific view at a specific time instance. In some examples of 3D video coding, a layer may contain either all coded depth pictures of a specific view or coded texture pictures of a specific view. In other examples of 3D video coding, a layer may contain both texture view components and depth view components of a specific view. Similarly, in the context of scalable video coding, a layer typically corresponds to coded pictures having video characteristics different from coded pictures in other layers. Such video characteristics typically include spatial resolution and quality level (Signal-to-Noise Ratio). In HEVC and its extensions, temporal scalability may be achieved within one layer by defining a group of pictures with a particular temporal level as a sub-layer.

For each respective layer of the bitstream, data in a lower layer may be decoded without reference to data in any higher layer. In scalable video coding, for example, data in a base layer may be decoded without reference to data in an enhancement layer. NAL units may only encapsulate data of a single layer. Thus, NAL units encapsulating data of the highest remaining layer of the bitstream may be removed from the bitstream without affecting the decodability of data in the remaining layers of the bitstream. In multi-view coding and 3D-HEVC, higher layers may include additional view components. In SHVC, higher layers may include signal to noise ratio (SNR) enhancement data, spatial enhancement data, and/or temporal enhancement data. In MV-HEVC, 3D-HEVC and SHVC, a view may be referred to as a "base layer" if a video decoder can decode pictures in the view without reference to data of any other layer. The base layer may conform to the HEVC base specification (e.g., HEVC WD).

One or more of the techniques of this disclosure relate to coding multi-view and 3D video data by coding texture and depth data. In general, the term "texture" is used to describe luminance (that is, brightness or "luma") values of an image and chrominance (that is, color or "chroma") values of the image. In some examples, a texture image may include one set of luminance data and two sets of chrominance data for blue hues (Cb) and red hues (Cr). In certain chroma sampling formats, such as 4:2:2 or 4:2:0, the chroma data is downsampled relative to the luma data. That is, the spatial resolution of chrominance pixels may be lower than the spatial resolution of corresponding luminance pixels, e.g., one-half or one-quarter of the luminance resolution.

A depth view component (i.e., a depth picture) may be a coded representation of the depth of a view in a single access unit. A depth view may be a sequence of depth view components associated with an identical value of a view order index. The depth view component may indicate depths of the pixels in its corresponding texture view component. As one example, the depth view component is a gray scale image that includes only luma values. In other words, the depth view component may not convey any image content, but rather may provide a measure of the depths of the pixels in the texture view component.

In some examples, a purely white pixel or zero valued in a depth view component indicates that its corresponding pixel or pixels in a corresponding texture view component is closer from the perspective of the viewer, and a purely black pixel or maximum valued in the depth view component indicates that its corresponding pixel or pixels in the corresponding texture view component is further away from the perspective of the viewer. The various shades of gray in between black and white indicate different depth levels. For instance, a dark gray pixel in a depth view component may indicate that a corresponding pixel in a texture view component is further away than a light gray pixel in the depth view component. Because only gray scale is needed to identify the depth of pixels, the depth view component need not include chroma components, as color values for the depth view component may not serve any purpose. The depth view component using only luma values (e.g., intensity values) to identify depth is provided for illustration purposes and should not be considered limiting. In other examples, any technique may be utilized to indicate relative depths of the pixels in the texture view component.

Depth data generally describes depth values for corresponding texture data. For example, a depth image may include a set of depth pixels that each describes depth for corresponding texture data. The depth data may be used to determine horizontal disparity for the corresponding texture data. Thus, a device that receives the texture and depth data may display a first texture image for one view (e.g., a left eye view) and may use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in a second view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change. Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur to present a slight perception of depth, or may be displayed in different locations for the left and right eye (e.g., with horizontal disparity that is opposite that of pixels located in front of the zero disparity plane). Many other techniques may also be used to convey or define depth data for an image.

For each pixel in the depth view component, there may be one or more corresponding pixels in the texture view component. For instance, if the spatial resolutions of the depth view component and the texture view component are the same, each pixel in the depth view component corresponds to one pixel in the texture view component. If the spatial resolution of the depth view component is less than that of the texture view component, then each pixel in the depth view component corresponds to multiple pixels in the texture view component. The value of the pixel in the depth view component may indicate the relative depth of the corresponding one or more pixels in the texture view.

In some examples, video encoder 20 signals video data for the texture view components and the corresponding depth view components for each of the views. Video decoder 30 may utilize both the video data of texture view components and the depth view components to decode the video content of the views for display. A display then displays the multi-view video to produce 3D video.

As indicated above, a bitstream may comprise a sequence of NAL units. Each of the NAL units includes a NAL unit header and encapsulates an RBSP. A design of MV-HEVC WD5 specifies 6 bits for layer identification which enable a bitstream to support up to 64 views without depth or 32 views with depth. The signaling of the layer identification is carried in a two-byte NAL unit header as defined in Table 1, below.

TABLE 1

| | Descriptor |
|---|---|
| nal_unit_header( ) { | |
|   forbidden_zero_bit | f(1) |
|   nal_unit_type | u(6) |
|   nuh_layer_id | u(6) |
|   nuh_temporal_id_plus1 | u(3) |
| } | |

In Table 1 and throughout this disclosure, syntax elements are designated in bold. Furthermore, in Table 1, and other syntax tables of this disclosure, a syntax element with a descriptor of the form f(n), where n is an integer number, is a fixed-pattern bit string using n bits written (from left to right) with the left bit first. A syntax element with a descriptor of the form u(n), where n is an integer number, is an unsigned integer using n bits. Thus, as shown in Table 1, the nal_unit_header syntax structure includes exactly 16 bits (i.e., 2 bytes).

In Table 1, forbidden_zero_bit shall be equal to 0. Furthermore, nal_unit_type specifies the type of RBSP data structure contained in the NAL unit as specified in Table 7-1 of HEVC WD. NAL units that have nal_unit_type in the range of UNSPEC48 . . . UNSPEC63, inclusive, for which semantics are not specified, do not affect the decoding process specified in the HEVC WD.

Furthermore, in Table 1, nuh_layer_id specifies the identifier of a layer to which the NAL unit belongs. As indicated in Table 1, nuh_layer_id is a 6 bit unsigned integer. Thus, 63 is the highest number that can be indicated by nuh_layer_id. nuh_temporal_id_plus1 minus 1 specifies a temporal identifier for the NAL unit. The value of nuh_temporal_id_plus1 shall not be equal to 0. The variable TemporalId is specified as follows: TemporalId=nuh_temporal_id_plus1−1. HEVC WD and MV-HEVC WD5 provide further notes and constraints applied to the semantics of the above described syntax elements.

It is envisioned that future video coding applications may require support for larger number of views, e.g., up to 100 or even 1000 views. The 6 bits currently allocated for layer/view identification is not enough to support the larger number of views. That is, the nuh_layer_id syntax element is limited to 6 bits, meaning that the nuh_layer_id syntax element can only indicate values from 0 to 63. Hence, the nuh_layer_id syntax element can only specify identifiers of 64 layers. However, it might not be desired to change the current allocation of bits in the NAL unit header or enlarge the size of NAL unit header since the current design with a 2 byte NAL unit header is compact and is sufficient to support many video applications.

This disclosure provides various solutions to support larger number of views, potentially without having to change the design structure of the NAL unit header specified in MV-HEVC WD5. For example, for HEVC extensions, this disclosure provides techniques that can be applied independently from each other or in combination, and apply to multi-view coding with or without depth, and other extensions to HEVC and other video codecs. Example aspects of this disclosure are inclusion of hooks to enable future extensibility for support of more than 64 views in one bitstream and possible support in future standards to make use of the hooks. Specific examples may include one or more of the following features in any suitable combination.

In one example, in an extension supporting many views, an additional VPS extension syntax structure shall be present in VPS/VPS extension that includes a syntax element to describe (e.g., indicate) the extended maximum number of layers. This disclosure may refer to the syntax element indicating the extended maximum number of layers as vps_max_layers_extended, vps_max_layers_extended may be coded as u(n), where n shall be the number of bits assigned for the layer identification layerId in the future extension. For each of such layers, a view_id may also be signaled in the additional VPS extension. The maximum number of layers can also be signaled in the additional VPS extension. More layer sets and output layer sets and their properties such as profile, tier, level, applicable HRD parameters, picture rate, bit rate, and so on, can also be signaled in the additional VPS extension.

In one example, the coding may reserve the most significant bit (MSB) of nuh_layer_id to be 0 in MV-HEVC. For example, in an extension, when the MSB bit is 1 (nuh_layer_id is greater than 31), an additional one byte, referred to as nuh_layer_id_ext, shall be present after syntax element nuh_temporal_id_plus1. The layerId is derived as layerId= (nul_layer_id_ext<<5)+(nul_layer_id & 31).

In another example, the video coding standard may reserve a NAL unit type in MV-HEVC, namely, NAL_VIEW_EXT, which is not used in the current MV-HEVC. For example, in an extension of the video coding standard, when the NAL unit type of a NAL unit is equal to NAL_VIEW_EXT, a three-byte NAL unit header is present in the NAL unit. This keeps the existing syntax elements in the slice header, but extends the NAL unit header with the following allocation of the additional 8-bits:
 a. 6-bits of NAL unit header as specified in the MV-HEVC WD5.
 b. 2 more bits for layerId, denoted as nul_layer_id_ext, so that layerId (i.e., the layer identifier of the layer corresponding to the NAL unit) is derived as: layerId= (nul_layer_id_ext<<6)+nuh_layer_id. Hence, this forms an 8-bit value supporting 256 views.

Alternatively, a four-byte NAL unit header can be used. In this case, a 16-bit value can support many more views. In another example, one additional NAL unit type can be recovered (NAL_VIEW_EXT_2BYTE), and the length of the NAL unit header is derived as follows: length=(nal unit type==NAL_VIEW_EXT_2BYTE?4: (nal unit type==NAL_VIEW_EXT?3: 2).

In some examples of this disclosure, the highest value of nuh_layer_id (i.e., 63 in MV-HEVC WD5) is reserved in MV-HEVC. Thus, video encoder 20 may generate a NAL unit header of a NAL unit of multi-layer (e.g., multi-view) video data. Similarly, video decoder 30 may obtain a NAL unit header of a NAL unit of the video data. In either case, the NAL unit header may comprise a layer identifier syntax element (e.g., nuh_layer_id) having a value that specifies an identifier of a layer to which the NAL unit belongs. A highest value of the layer identifier syntax element is reserved (i.e., not allowed to be used) in a video coding standard, such as MV-HEVC, as one example. In general, the term "reserved" specifies that one or more values of a particular syntax element are for future use and shall not be used in a particular version of a video coding standard (e.g., a version of MV-HEVC), but may be used for extensions of the video coding standard, such as an extension of MV-HEVC that supports higher numbers of layers. For instance, the layer identifier syntax element may comprise a plurality of bits (e.g., 6 bits) that represent the value within a defined range of values (e.g., 0 to 63). A requirement of the bitstream conforming to a video coding standard (e.g., MV-HEVC, 3D-HEVC, SHVC, etc.) is that the value of the layer identifier syntax element is less than the maximum value of the range of values (e.g., 63).

In some examples, in an extension (e.g., an extension of MV-HEVC) supporting many views, when nuh_layer_id is equal to the highest value of the layer identifier syntax element (e.g., 63), one or more additional bytes are present in the NAL unit header. For example, the NAL unit header can contain two additional bytes, wherein the two bytes indicate a larger value of nuh_layer_id after syntax element nuh_temporal_id_plus1. Thus, in some examples where video data conforms to an extension of a video coding standard (e.g., MV-HEVC) supporting more layers than the video coding standard, when a value of the layer identifier syntax element in the NAL unit header of the NAL unit is equal to the highest value of the layer identifier syntax element (i.e., the maximum value of the range of values), video encoder 20 may include, in the NAL unit header, one or more additional bytes. When the layer identifier syntax element is not equal to the highest value of the layer identifier syntax element, video encoder 20 may not include, in the NAL unit header, the one or more additional bytes. Similarly, when a value of the layer identifier syntax element (e.g., nuh_layer_id) in the NAL unit header of the NAL unit is equal to the highest value of the layer identifier syntax element, video decoder 30 may determine that the NAL unit header contains one or more additional bytes. When the layer identifier syntax element is not equal to the highest value of the layer identifier syntax element, video decoder 30 may determine that the NAL unit header does not contain the one or more additional bytes.

In some examples, the additional one byte or two bytes form a syntax element nuh_layer_id_ext. Thus, in some examples, the one or more additional bytes form an additional syntax element that indicates a larger value of the layer identifier syntax element. In another example, only one additional byte is added.

In one example, a layer identifier of a NAL unit, layerId, is derived as: layerId=(nuh_layer_id==63)?((nuh_layer_id_ext<<6)+nuh_layer_id−1): nuh_layer_id. In other words, in this example, layerId is equal to (nuh_layer_id_ext<<6)+nuh_layer_id−1) if nuh_layer_id is equal to 63, and equal to nuh_layer_id otherwise. In this way, the one or more additional bytes in the NAL unit header form an additional syntax element (e.g., nuh_layer_id_ext). Thus, when the value of the layer identifier syntax element is equal to the highest value of the layer identifier syntax element (e.g., 63), the identifier of the layer to which the NAL unit belongs is equal to a sum of a value of the additional syntax element left shifted by six positions and the value of the layer identifier syntax element (e.g., nuh_layer_id) minus 1. When the value of the layer identifier syntax element is not equal to the highest value of the layer identifier syntax element, the identifier of the layer to which the NAL unit belongs is equal to the value of the layer identifier syntax element. For instance, when the value of the layer identifier syntax element is equal to the highest value of the layer identifier syntax element, video decoder 30 may derive the identifier of the layer to which the NAL unit belongs to be equal to a sum of a value of the additional syntax element that is left shifted by six positions and the value of the layer identifier syntax element minus 1. When the value of the layer identifier syntax element is not equal to the highest value of the layer identifier syntax element, video decoder 30 may derive the identifier of the layer to which the NAL unit belongs as the value of the layer identifier syntax element.

In an alternative example, the layer identifier layerId of the NAL unit is derived as: layerId=(nuh_layer_id==63)?nuh_layer_id_ext: nuh_layer_id. In other words, in this example, layerId is equal to nuh_layer_id_ext if nuh_layer_id is equal to 63 and equal to nuh_layer_id otherwise. In this way, the one or more additional bytes in the NAL unit header form an additional syntax element (e.g., nuh_layer_id_ext). Thus, when the value of the layer identifier syntax element is equal to the highest value of the layer identifier syntax element (e.g., 63), the identifier of the layer to which the NAL unit belongs is equal to a value of the additional syntax element. When the value of the layer identifier syntax element is not equal to the highest value of the layer identifier syntax element, the identifier of the layer to which the NAL unit belongs is equal to the value of the layer identifier syntax element (e.g., nuh_layer_id). For instance, when the value of the layer identifier syntax element is equal to the highest value of the layer identifier syntax element, video decoder 30 may derive the identifier of the layer to which the NAL unit belongs as a value of the additional syntax element. When the value of the layer identifier syntax element is not equal to the highest value of the layer identifier syntax element, video decoder 30 may derive the identifier of the layer to which the NAL unit belongs as the value of the layer identifier syntax element.

In an alternative example, the layer identifier of a NAL unit layerId is derived as: layerId=(nuh_layer_id==63)?nuh_layer_id_ext+63: nuh_layer_id. In other words, in this example, layerId is equal to nuh_layer_id_ext+63 if nuh_layer_id is equal to 63 and equal to nuh_layer_id otherwise. In this way, the one or more additional bytes of the NAL unit form an additional syntax element (e.g., nuh_layer_id_ext). Thus, when the value of the layer identifier syntax element (e.g., nuh_layer_id) is equal to the highest value of the layer identifier syntax element (e.g., 63), the identifier of the layer to which the NAL unit belongs is equal to a sum of the highest value of the layer identifier syntax element and a value of the additional syntax element. When the value of the layer identifier syntax element is not equal to the highest value of the layer identifier syntax element, the identifier of the layer to which the NAL unit belongs is equal to the value of the layer identifier syntax element. For instance, when the value of the layer identifier syntax element is equal to the highest value of the layer identifier syntax element, video decoder 30 may derive the identifier of the layer to which the NAL unit belongs as a sum of the highest value of the layer identifier syntax element and a value of the additional syntax element. When the value of the layer identifier syntax element is not equal to the highest value of the layer identifier syntax element, video decoder 30 may derive the identifier of the layer to which the NAL unit belongs as the value of the layer identifier syntax element.

Figure 2:
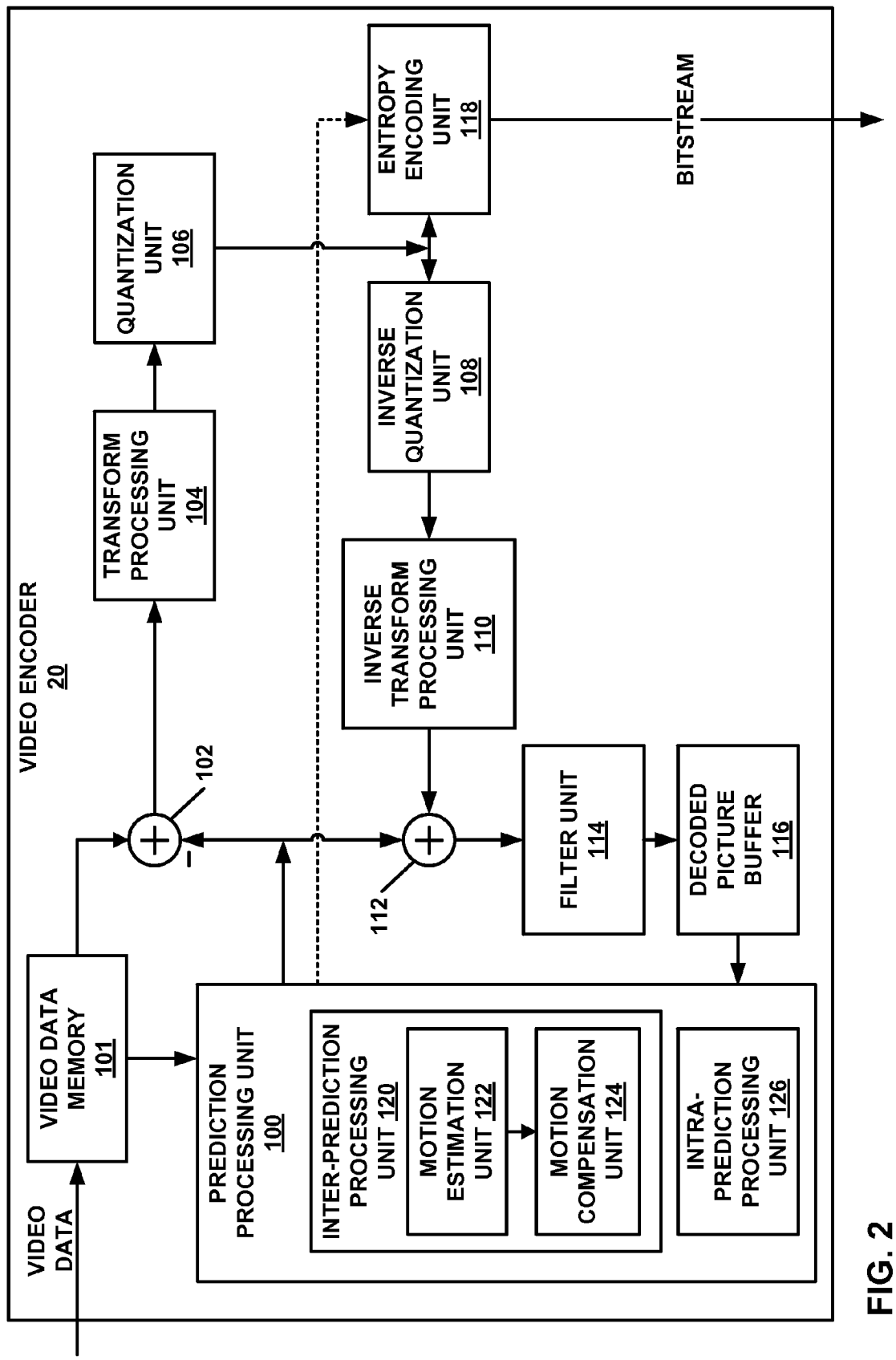
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a prediction processing unit 100, a video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 receives video data. Video data memory 101 may store video data to be encoded by the components of video encoder 20. For example, the video data stored in video data memory 101 may be obtained from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may encode each CTU in a slice of a picture of the video data. In some examples, each of the CTUs may be associated with equally-sized luma coding tree blocks (CTBs) and corresponding chroma CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

If a PU is in a P slice, motion estimation unit 122 may search the reference pictures in a list of reference pictures (e.g., "RefPicList0") for a reference region for the PU. The reference region for the PU may be a region, within a reference picture, that contains samples that most closely correspond to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a coding block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive blocks for the PU. When performing intra prediction using a particular intra prediction mode, intra-prediction processing unit 126 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on coding blocks (e.g., luma, Cb and Cr coding blocks) of a CU and the selected predictive blocks (e.g., predictive luma, Cb and Cr blocks) of the PUs of the CU, residual blocks (e.g., luma, Cb and Cr residual blocks) of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118.

In accordance with one or more techniques of this disclosure, as part of generating the bitstream, video encoder 20 of FIG. 2 may generate a NAL unit header of a NAL unit of multi-layer video data. The NAL unit header comprises a layer identifier syntax element that specifies an identifier of a layer to which the NAL unit belongs. A highest value of the layer identifier syntax element is not allowed to be used in a video coding standard, such as MV-HEVC. Furthermore, in some examples of this disclosure, when the multi-layer video data conforms to an extension of the video coding standard supporting more layers than the video coding standard and a value of the layer identifier syntax element in the NAL unit header of the NAL unit is equal to the highest value of the layer identifier syntax element (e.g., 63), video encoder 20 may include, in the NAL unit header, one or more additional bytes. In this extension of the video coding standard, when the layer identifier syntax element is not equal to the highest value of the layer identifier syntax element, video encoder 20 may not include, in the NAL unit header, the one or more additional bytes.

Figure 3:
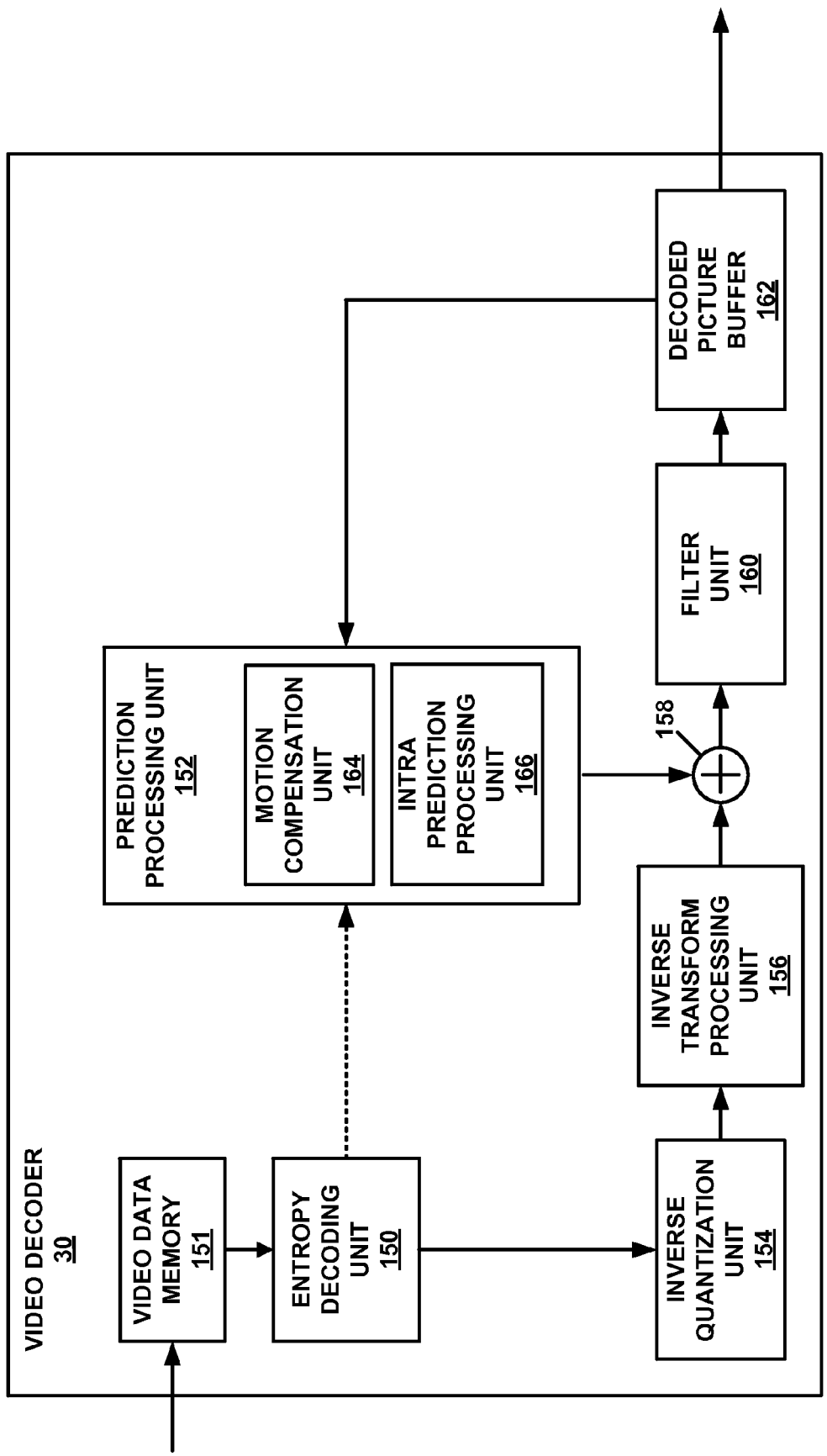
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

A coded picture buffer (CPB) 151 may receive and store encoded video data (e.g., NAL units) of a bitstream. The video data stored in CPB 151 may be obtained, for example, from channel 16, e.g., from a local video source, such as a camera, via wired or wireless network communication of video data, or by accessing physical data storage media. CPB 151 may form a video data memory that stores encoded video data from an encoded video bitstream. Decoded picture buffer 162 may be a reference picture memory that stores reference video data for use in decoding video data by video decoder 30, e.g., in intra- or inter-coding modes. CPB 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. CPB 151 and decoded picture buffer 162 may be provided by the same memory device or separate memory devices. In various examples, CPB 151 may be on-chip with other components of video decoder 30, or off-chip relative to those components.

Entropy decoding unit 150 may receive NAL units from CPB 151 and may parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

In accordance with one or more techniques of this disclosure, entropy decoding unit 150 (or another component of video decoder 30) may obtain a NAL unit header of a NAL unit of multi-layer video data. The NAL unit header may comprise a layer identifier syntax element that specifies an identifier of a layer to which the NAL unit belongs. A highest value of the layer identifier syntax element is not allowed to be used in a video coding standard. Furthermore, in some examples, when the multi-layer video coding data conforms to an extension of the video coding standard that supports more layers than the video coding standard and a value of the layer identifier syntax element in the NAL unit header of the NAL unit is equal to the highest value of the layer identifier syntax element (e.g., 63), entropy decoding unit 150 (or other component of video decoder 30) may determine that the NAL unit header contains one or more additional bytes. When the multi-layer video data conforms to the extension of the video coding standard and the layer identifier syntax element is not equal to the highest value of the layer identifier syntax element, entropy decoding unit 150 (or other component of video decoder 30) may determine that the NAL unit header does not contain the one or more additional bytes.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice.

In addition to decoding syntax elements from the bitstream, video decoder 30 may perform a decoding operation on a CU. By performing the decoding operation on a CU, video decoder 30 may reconstruct coding blocks of the CU.

As part of performing a decoding operation on a CU, inverse quantization unit 154 may inverse quantize, i.e., de-quantize, coefficient blocks associated with TUs of the CU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb, and Cr blocks for the PU based on the prediction blocks of spatially-neighboring PUs. Intra-prediction processing unit 166 may determine the intra prediction mode for the PU based on one or more syntax elements obtained (e.g., decoded) from the bitstream.

Prediction processing unit 152 may construct a first reference picture list (RefPicList0) and a second reference picture list (RefPicList1) based on syntax elements obtained (e.g., extracted) from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit 164 may generate, based on samples at the one or more reference blocks for the PU, predictive blocks (e.g., predictive luma, Cb, and Cr blocks) for the PU.

Reconstruction unit 158 may use the residual values from the transform blocks (e.g., luma, Cb, and Cr transform blocks) of TUs of a CU and the predictive blocks (e.g., luma, Cb, and Cr transform blocks) of the PUs of the CU, i.e., either intra-prediction data or inter-prediction data, as applicable, to reconstruct the coding blocks (e.g., luma, Cb, and Cr coding blocks) of the CU. For example, reconstruction unit 158 may add samples of the transform blocks (e.g., luma, Cb, and Cr transform blocks) to corresponding samples of the predictive blocks (e.g., luma, Cb, and Cr predictive blocks) to reconstruct the coding blocks (e.g., luma, Cb, and Cr coding blocks) of the CU.

Filter unit 160 may perform a deblocking operation to reduce blocking artifacts associated with the coding blocks (e.g., luma, Cb, and Cr coding blocks) of the CU. Video decoder 30 may store the coding blocks (e.g., luma, Cb, and Cr coding blocks) of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks (e.g., luma, Cb, and Cr blocks) in decoded picture buffer 162, intra prediction or inter prediction operations on PUs of other CUs. In this way, video decoder 30 may extract, from the bitstream, transform coefficient levels of the significant coefficient block, inverse quantize the transform coefficient levels, apply a transform to the transform coefficient levels to generate a transform block, generate, based at least in part on the transform block, a coding block, and output the coding block for display.

Figure 4A:
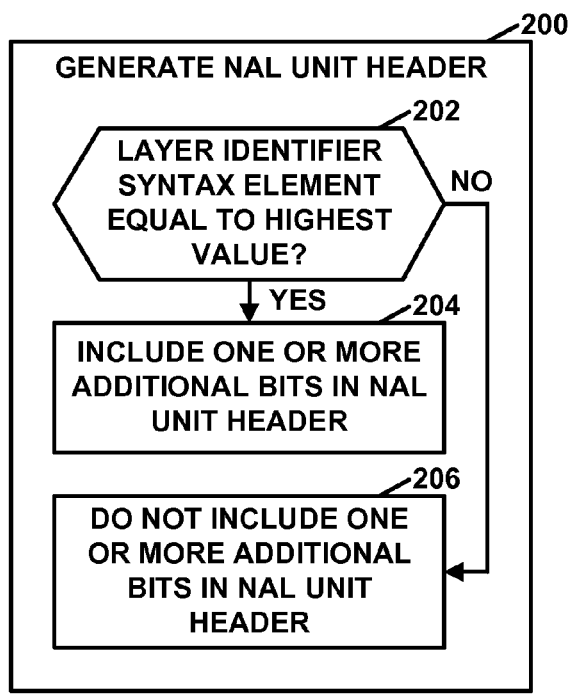
FIG. 4A is a flowchart illustrating an example operation of a video encoder to generate a NAL unit header, in accordance with one or more techniques of this disclosure.

FIG. 4A is a flowchart illustrating an example operation of video encoder 20 to generate a NAL unit header, in accordance with one or more techniques of this disclosure. The operation of FIG. 4A, along with operations illustrated in other flowcharts of this disclosure, are examples. Other example operations in accordance with the techniques of this disclosure may include more, fewer, or different actions.

In the example of FIG. 4A, video encoder 20 generates a NAL unit header of a NAL unit of multi-layer video data (200). The NAL unit header comprises a layer identifier syntax element having a value that specifies an identifier of a layer to which the NAL unit belongs. In accordance with one or more techniques of this disclosure, a highest value of the layer identifier syntax element is not allowed to be used in a video coding standard. For instance, the layer identifier syntax element may comprise a plurality of bits that represent the value within a defined range of values. A requirement of the bitstream conforming to a video coding standard is that the value of the layer identifier syntax element is less than the maximum value of the range of values.

Furthermore, in the example of FIG. 4A, generating the NAL unit header comprises determining whether a layer identifier of the NAL unit is greater than or equal to the highest value of the layer identifier syntax element (e.g., 63) (202). When the layer identifier syntax element is greater than or equal to the highest value of the layer identifier syntax element ("YES" of 202), video encoder 20 may include, in the NAL unit header, one or more additional bytes (204). The layer identifier syntax element may consist of 6 bits. When the layer identifier syntax element is not greater than or equal to the highest value of the layer identifier syntax element ("NO" of 202), video encoder 20 may not include, in the NAL unit header, the one or more additional bytes (206).

As indicated above, FIG. 4A is an example. Other examples may include more, fewer, or different actions. For instance, some examples of this disclosure exclude actions 202, 204, and/or 206.

Figure 4B:
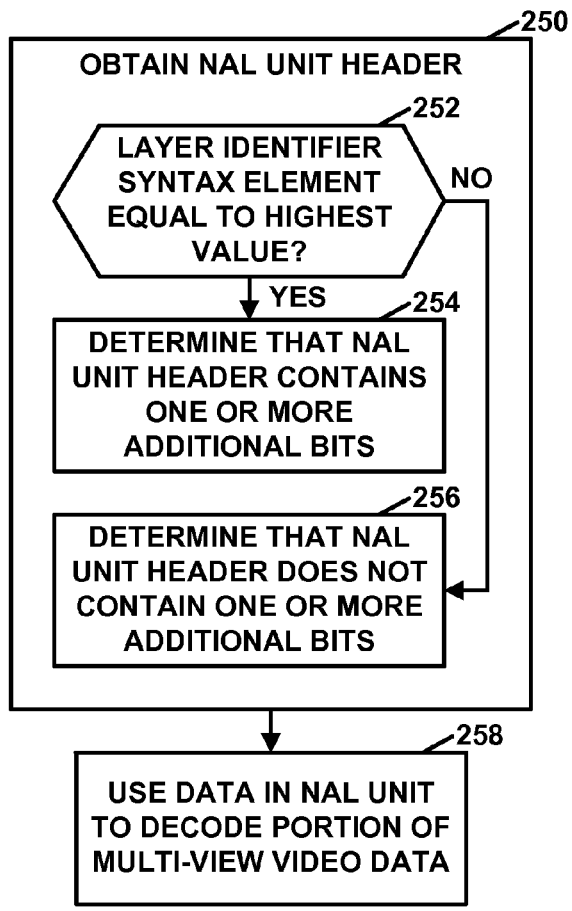
FIG. 4B is a flowchart illustrating an example operation of a video decoder to obtain a NAL unit header, in accordance with one or more techniques of this disclosure.

FIG. 4B is a flowchart illustrating an example operation of a video decoder to obtain a NAL unit header, in accordance with one or more techniques of this disclosure. In the example of FIG. 4B, video decoder 30 may obtain a NAL unit header of a NAL unit of multi-layer video data (250). The NAL unit header may comprise a layer identifier syntax element having a value that specifies an identifier of a layer to which the NAL unit belongs. In accordance with one or more techniques of this disclosure, a highest value of the layer identifier syntax element is not allowed to be used in a video coding standard. For instance, the layer identifier syntax element may comprise a plurality of bits that represent the value within a defined range of values. A requirement of the bitstream conforming to a video coding standard is that the value of the layer identifier syntax element is less than the maximum value of the range of values.

In the example of FIG. 4B, obtaining NAL unit header comprises determining whether the layer identifier syntax element is equal to the highest value of the layer identifier syntax element (e.g., 63) (252). When a value of the layer identifier syntax element in the NAL unit header of the NAL unit is equal to the highest value of the layer identifier syntax element ("YES" of 252), video decoder 30 may determine that the NAL unit header contains one or more additional bytes (254). In some examples, the layer identifier syntax element consists of 6 bits. When the layer identifier syntax element is not equal to the highest value of the layer identifier syntax element ("NO" of 252), video decoder 30 may determine that the NAL unit header does not contain the one or more additional bytes (256).

Furthermore, in the example of FIG. 4B, video decoder 30 may use data in the NAL unit to decode at a portion of the multi-layer video data (258). For example, if the NAL unit is a coded slice NAL unit, video decoder 30 may use data in the NAL unit to decode video data of a particular slice.

As indicated above, FIG. 4B is an example. Other examples may include more, fewer, or different actions. For instance, some examples of this disclosure exclude actions 252, 254, and/or 256.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In one or more examples, the functions described may be implemented in hardware, software, firmware, or any combination thereof. Such techniques may be implemented in any of a variety of devices such as general purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the functions may be stored on or transmitted over, as one or more instructions or code, a computer-readable medium and executed by a hardware-based processing unit. In other words, if implemented in software, the techniques may be realized at least in part by a computer-readable data storage medium comprising program code including instructions that, when executed, performs one or more of the methods described above. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. The computer-readable data storage medium may form part of a computer program product, which may include packaging materials. Thus, a computer program product may include a computer-readable medium.

By way of example, and not limitation, such computer-readable storage media can comprise RAM such as synchronous dynamic random access memory (SDRAM), ROM, non-volatile random access memory (NVRAM), electrically erasable programmable read-only memory (EEPROM), CD-ROM, FLASH memory, or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

The techniques additionally, or alternatively, may be realized at least in part by a computer-readable communication medium that carries or communicates program code in the form of instructions or data structures and that can be accessed, read, and/or executed by a computer, such as propagated signals or waves. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions (e.g., program code) may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. Such a processor may be configured to perform any of the techniques described in this disclosure. In addition, in some aspects, the functionality described herein may be provided within dedicated hardware and/or software modules configured for encoding and decoding, or incorporated in a combined codec. Also, the techniques could be fully implemented in one or more circuits or logic elements.

A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device.

Various examples have been described. These and other examples are within the scope of the following claims.

What is claimed is:

1. A method of decoding multi-layer video data, the method comprising:
    obtaining, by one or more processor circuits, from a bitstream, a Network Abstraction Layer (NAL) unit header of a NAL unit of the multi-layer video data, the NAL unit header comprising a layer identifier syntax element, wherein the layer identifier syntax element comprises a plurality of bits capable of representing values from 0 to 63;
    based on a value of the layer identifier syntax element being equal to 63, determining, by the one or more processor circuits, that the NAL unit header contains one or more additional bytes, wherein when the value of the layer identifier syntax element in the NAL unit header of the NAL unit is not equal to 63, the NAL unit header does not contain the one or more additional bytes;
    determining, by the one or more processor circuits, based on the value of the layer identifier syntax element and the one or more additional bytes, a layer identifier of the NAL unit; and
    using, by the one or more processor circuits, data in the NAL unit to decode a portion of the multi-layer video data.

2. The method of claim 1, wherein the layer identifier syntax element consists of 6 bits.

3. The method of claim 1, wherein the one or more additional bytes form an additional syntax element that indicates a larger value of the layer identifier syntax element.

4. The method of claim 1, wherein the one or more additional bytes form an additional syntax element and determining the layer identifier of the NAL unit comprises:
    based on the value of the layer identifier syntax element being equal to 63, deriving, by the one or more processor circuits, the layer identifier of the NAL unit such that the layer identifier of the NAL unit is equal to a sum of a value of the additional syntax element left shifted by six positions and the value of the layer identifier syntax element minus 1, wherein when the value of the layer identifier syntax element is not equal to 63, the layer identifier of the NAL unit is the value of the layer identifier syntax element.

5. The method of claim 1, wherein the one or more additional bytes form an additional syntax element and determining the layer identifier of the NAL unit comprises:
    based on the value of the layer identifier syntax element being equal to 63, deriving, by the one or more processor circuits, the layer identifier of the NAL unit as a value of the additional syntax element, wherein when the value of the layer identifier syntax element is not equal to 63, the layer identifier of the NAL unit is the value of the layer identifier syntax element.

6. The method of claim 1, wherein the one or more additional bytes form an additional syntax element and determining the layer identifier of the NAL unit comprises:

based on the value of the layer identifier syntax element being equal to 63, deriving, by the one or more processor circuits, the layer identifier of the NAL unit as a sum of 63 and a value of the additional syntax element, wherein when the value of the layer identifier syntax element is not equal to 63, the layer identifier of the NAL unit is the value of the layer identifier syntax element.

7. A method of encoding multi-layer video data, the method comprising:
generating, by one or more processor circuits, a Network Abstraction Layer (NAL) unit header of a NAL unit of the multi-layer video data, the NAL unit header comprising a layer identifier syntax element, wherein the layer identifier syntax element comprises a plurality of bits capable of representing values from 0 to 63, wherein generating the NAL unit header comprises:
based on a layer identifier of the NAL unit being greater than or equal to 63, setting, by the one or more processor circuits, the layer identifier syntax element equal to 63 and including one or more additional bytes in the NAL unit header, wherein:
a video decoder is able to determine the layer identifier of the NAL unit based on the value of the layer identifier syntax element and the one or more additional bytes, and
when the layer identifier of the NAL unit is less than 63, the NAL unit header does not contain the one or more additional bytes; and
outputting, by the one or more processor circuits, a bitstream that includes the NAL unit.

8. The method of claim 7, wherein the layer identifier syntax element consists of 6 bits.

9. The method of claim 7, wherein the one or more additional bytes form an additional syntax element that indicates a larger value of the layer identifier syntax element.

10. The method of claim 7, wherein:
the one or more additional bytes form an additional syntax element,
based on the value of the layer identifier syntax element being equal to 63, the layer identifier of the NAL unit is equal to a sum of a value of the additional syntax element left shifted by six positions and the value of the layer identifier syntax element minus 1, wherein when the value of the layer identifier syntax element is not equal to 63, the layer identifier of the NAL unit is equal to the value of the layer identifier syntax element.

11. The method of claim 7, wherein:
the one or more additional bytes form an additional syntax element,
based on the value of the layer identifier syntax element being equal to 63, the layer identifier of the NAL unit is equal to a value of the additional syntax element, wherein when the value of the layer identifier syntax element is not equal to 63, the layer identifier of the NAL unit is equal to the value of the layer identifier syntax element.

12. The method of claim 7, wherein:
the one or more additional bytes form an additional syntax element,
based on the value of the layer identifier syntax element being equal to 63, the layer identifier of the NAL unit is equal to a value derived as a sum of 63 and a value of the additional syntax element, wherein when the value of the layer identifier syntax element is not equal to 63, the layer identifier of the NAL unit is equal to the value of the layer identifier syntax element.

13. A computing device for decoding multi-layer video data, the computing device comprising:
a memory storing the multi-layer video data; and
one or more processor circuits configured to:
obtain, from a bitstream, a Network Abstraction Layer (NAL) unit header of a NAL unit of the multi-layer video data, the NAL unit header comprising a layer identifier syntax element, wherein the layer identifier syntax element comprises a plurality of bits capable of representing values from 0 to 63; based on a value of the layer identifier syntax element being equal to 63, determine that the NAL unit header contains one or more additional bytes, wherein when the value of the layer identifier syntax element in the NAL unit header of the NAL unit is not equal to 63, the NAL unit header does not contain the one or more additional bytes;
determine, based on the value of the layer identifier syntax element and the one or more additional bytes, a layer identifier of the NAL unit; and
use data in the NAL unit to decode a portion of the multi-layer video data.

14. The computing device of claim 13, wherein the layer identifier syntax element consists of 6 bits.

15. The computing device of claim 13, wherein the one or more additional bytes form an additional syntax element that indicates a larger value of the layer identifier syntax element.

16. The computing device of claim 13, wherein the one or more additional bytes form an additional syntax element, the one or more processor circuits further configured to:
based on the value of the layer identifier syntax element being equal to 63, derive the layer identifier of the NAL unit such that the layer identifier of the NAL unit is equal to a sum of a value of the additional syntax element left shifted by six positions and the value of the layer identifier syntax element minus 1, wherein when the value of the layer identifier syntax element is not equal to 63, the layer identifier of the NAL unit is the value of the layer identifier syntax element.

17. The computing device of claim 13, wherein the one or more additional bytes form an additional syntax element, the one or more processor circuits are configured such that, as part of determining the layer identifier of the NAL unit, the one or more processor circuits:
based on the value of the layer identifier syntax element being equal to 63, derive the layer identifier of the NAL unit as a value of the additional syntax element, wherein when the value of the layer identifier syntax element is not equal to 63 the layer identifier of the NAL unit is the value of the layer identifier syntax element.

18. The computing device of claim 13, wherein the one or more additional bytes form an additional syntax element, the one or more processor circuits are configured such that, as part of determining the layer identifier of the NAL unit, the one or more processor circuits:
based on the value of the layer identifier syntax element being equal to 63, derive the layer identifier of the NAL unit as a sum of 63 and a value of the additional syntax element, wherein when the value of the layer identifier syntax element is not equal to 63, the layer identifier of the NAL unit is the value of the layer identifier syntax element.

19. A computing device for encoding multi-layer video data, the computing device comprising:
a memory storing the multi-layer video data; and
one or more processor circuits configured to generate a Network Abstraction Layer (NAL) unit header of a NAL unit of the multi-layer video data, the NAL unit header comprising a layer identifier syntax element, wherein the layer identifier syntax element comprises a plurality of bits capable of representing values from 0 to 63, wherein generating the NAL unit header comprises:
based on a layer identifier of a Network Abstraction Layer (NAL) unit being greater than or equal to 63, set the layer identifier syntax element equal to 63 and including one or more additional bytes in the NAL unit header, wherein:
a video decoder is able to determine the layer identifier of the NAL unit based on the value of the layer identifier syntax element and the one or more additional bytes, and
when the layer identifier of the NAL unit is less than 63, the NAL unit header does not contain the one or more additional bytes;
output a bitstream that includes the NAL unit.

20. The computing device of claim 19, wherein the layer identifier syntax element consists of 6 bits.

21. The computing device of claim 19, wherein the one or more additional bytes form an additional syntax element that indicates a larger value of the layer identifier syntax element.

22. The computing device of claim 19, wherein:
the one or more additional bytes form an additional syntax element,
based on the value of the layer identifier syntax element being equal to 63, the layer identifier of the NAL unit is equal to one of:
a sum of a value of the additional syntax element left shifted by six positions and the value of the layer identifier syntax element minus 1,
a value of the additional syntax element, or
a sum of 63 and a value of the additional syntax element; and
when the value of the layer identifier syntax element is not equal to 63, the layer identifier of the NAL unit is equal to the value of the layer identifier syntax element.

* * * * *